United States Patent
Nielsen et al.

(10) Patent No.: US 12,092,075 B2
(45) Date of Patent: Sep. 17, 2024

(54) METHOD OF PROLONGING PITCH BEARING LIFETIME AND PITCH BEARING

(71) Applicant: Vestas Wind Systems A/S, Aarhus (DK)

(72) Inventors: Jens Bredal Nielsen, Struer (DK); Mads Broelsmand Hansen, Odder (DK); Alexander Dierking, Silkeborg (DK); Lasse Godballe Andersen, Hjortshøj (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/267,802

(22) PCT Filed: Jul. 13, 2021

(86) PCT No.: PCT/DK2021/050239
§ 371 (c)(1),
(2) Date: Jun. 16, 2023

(87) PCT Pub. No.: WO2022/057987
PCT Pub. Date: Mar. 24, 2022

(65) Prior Publication Data
US 2024/0068447 A1 Feb. 29, 2024

(30) Foreign Application Priority Data

Dec. 23, 2020 (EP) .................................... 20216892

(51) Int. Cl.
*F03D 1/06* (2006.01)
*F03D 13/10* (2016.01)
(Continued)

(52) U.S. Cl.
CPC ........... *F03D 13/104* (2023.08); *F03D 1/066* (2023.08); *F03D 80/701* (2023.08); *F03D 80/502* (2023.08); *F05B 2230/80* (2013.01)

(58) Field of Classification Search
CPC ...... F03D 7/0224; F03D 80/70; F03D 1/0658; F16C 2360/31
See application file for complete search history.

(56) References Cited

U.S. PATENT DOCUMENTS 8,047,792 B2 * 11/2011 Bech .................. F03D 80/70
416/204 R
10,900,470 B2 * 1/2021 Elmose ................. F03D 1/0658
(Continued)

FOREIGN PATENT DOCUMENTS

CN 104533728 A 4/2015
EP 2623772 A1 8/2013
(Continued)

OTHER PUBLICATIONS

European Patent Office, Extended European Search Report issued in corresponding European Patent Application No. 20216892.8, dated Jun. 4, 2021.
(Continued)

*Primary Examiner* — Justin D Seabe
(74) *Attorney, Agent, or Firm* — Wood Herron & Evans LLP

(57) ABSTRACT

The invention relates to a method of prolonging pitch bearing lifetime for a wind turbine as well as the pitch bearing itself. The method comprises the steps of: —stopping the rotor (4) from rotating; —removing a plurality of first fastening means used for mounting the blade (5) to the outer bearing ring (24); —mounting a strengthening arc structure (10) on said outer bearing ring (24), opposite the blade (5); —installing a plurality of second fastening means,
(Continued)

thereby connecting said blade (5) and said strengthening arc structure (10) to said outer bearing ring (24).

15 Claims, 3 Drawing Sheets

(51) Int. Cl.
    *F03D 80/70*     (2016.01)
    *F03D 80/50*     (2016.01)

(56) References Cited

U.S. PATENT DOCUMENTS

| | | |
|---|---|---|
| 11,293,399 B2 * | 4/2022 | Pascual Resano .... F03D 7/0224 |
| 11,454,219 B2 * | 9/2022 | Rieken .................... F03D 80/70 |
| 2008/0213095 A1 | 9/2008 | Bech et al. |

FOREIGN PATENT DOCUMENTS

| | | |
|---|---|---|
| EP | 2853733 A1 | 4/2015 |
| EP | 3312414 A1 | 4/2018 |

OTHER PUBLICATIONS

International Searching Authority, International Search Report and Written Opinion issued in corresponding PCT Application No. PCT/DK2021/050239, dated Oct. 1, 2021.

\* cited by examiner

METHOD OF PROLONGING PITCH BEARING LIFETIME AND PITCH BEARING

FIELD OF THE INVENTION

The present invention relates to a method of prolonging pitch bearing lifetime with a strengthening arc structure, and a pitch bearing comprising a strengthening arc structure.

BACKGROUND OF THE INVENTION

A wind turbine known in the art comprises a wind turbine tower and a wind turbine nacelle positioned on top of the tower. A wind turbine rotor with three wind turbine blades is connected to the nacelle through a low speed shaft, which extends out of the nacelle front as illustrated on FIG. 1.

Modern wind turbines control the load on the rotor by pitching the blades in and out of the incoming wind. The blades are pitched to optimize the output or to protect the wind turbine from damaging overloads.

For this purpose, each blade is provided with a pitch bearing between the hub and the blade, and some sort of mechanism, most common is electric motor(s) or hydraulic cylinder(s), to provide the force for pitching the blade and maintaining it in a given position. This pitching arrangement enables each blade to be turned approximately 90° around their longitudinal axis.

Continuous technological development is seeing successive generations of wind turbines grow in size in order to extract more energy form the wind and to decrease the cost of produced energy. The wind load on the blades get bigger as wind turbines get bigger, and as both blades and hub get bigger the more relatively soft and flexible they get. These facts make the pitch bearings very crucial components of the rotor, in that they have to be able to transfer the moment produced by the wind load to the hub and at the same time enable that the blades can rotate freely and accurately.

It has been seen that pitch bearings after some years fulfilling their purpose get fatigue and are in risk of cracking. An obvious solution to this problem would be to replace the pitch bearing, which however would be a very costly solution. Another solution would be to insert a blade adapter as seen in U.S. Ser. No. 10/844,833B2, where the blade adapter has axially running ribs for stiffening the bearing.

A major problem with both above solutions is that they require removal of the blade in order to carry these out. Such blade removal typically involves the use of an external crane, which is undesired due to time and costs.

An object of the present invention is therefore to provide a cost-efficient method of ensuring prolonged pitch bearing lifetime.

CN104533728A discloses a pitch bearing, wherein an upper and a lower full 360° stiffening device is used to stiffen the full pitch bearing. This facilitates that a cheaper bearing material may be used for the full pitch bearing.

EP2853733A1 discloses using shim plates for mitigating loads in a pitch bearing of a wind turbine between an inner bearing ring and a blade. Further, also shim plates may be used between an outer bearing ring and the hub.

EP3312414A1 discloses a pitch bearing reinforcement of a wind turbine, where the inner bearing ring is attached to the blade and the outer bearing ring is attached to the hub. The concept is to add pitch bearing reinforcements in a plurality of elements of varying length, such that a smooth stiffness variation along the bearing ring is achieved.

US2008/213095A1 discloses a wind turbine with flexibility enhancing means mounted on the pitch bearing in a system, where the hub is mounted to an outer bearing ring and the blade is mounted to an inner bearing ring.

SUMMARY OF THE INVENTION

The invention relates to a method of prolonging pitch bearing lifetime for a wind turbine comprising a rotor, a nacelle, and a tower; said rotor comprising a hub and at least one pitch controlled wind turbine blade, said blade comprising a pitch bearing including an inner and an outer bearing ring, and pitch controlling means for pitching said blade by means of said bearing. Said inner bearing ring is mounted on said hub and said blade is mounted on and abuts said outer bearing ring. Said method comprises the steps of:
  stopping said rotor from rotating;
  removing a plurality of first fastening means used for mounting said blade to said outer bearing ring;
  mounting a strengthening arc structure on said outer bearing ring, opposite the blade;
  installing a plurality of second fastening means, thereby connecting said blade and said strengthening arc structure to said outer bearing ring.

By providing the outer bearing ring, connected to the blade, with a strengthening arc structure it is possible to strengthen the outer bearing ring in the area most in need and thereby ensure that even though the bearing is subject to strong forces, the bearing will not crack and will instead maintain its full functionality without being damaged or excessively strained. In addition, the strengthening arc structure may provide an improvement in the load distribution between the raceways. These benefits according to the present invention may be achieved without the use of an external crane. It is important to realize that these potential problems with cracking of the outer bearing ring is not an issue in systems as in the prior art documents mentioned above with inner bearing ring attached to the blade and outer bearing ring attached to the hub. The reason for this being that in the prior art systems, excessive forces will mainly cause ovality of the bearing rings, as further described further here below, instead of cracking.

In an embodiment of the invention, said plurality of first fastening means comprises bolts, nuts and/or studs. The main advantageous implementations of the present invention are where
  1) the blades are mounted with studs and nuts, where only the nuts are taken off for mounting the strengthening arc structure,
  2) the blades are mounted with bolts, which are taken off for mounting the strengthening arc structure, and
  3) the blades are mounted with studs and nuts, and both studs and nuts are taken off for mounting the strengthening arc structure.

Option 1) is considered most preferable, as nuts alone are of much lower weight than bolts/studs. However, for turbines where bolts have been used, option 2) has to be used (though studs/nuts can then be used as second fastening means for fastening afterwards, if desired). Option 3) may be required if the studs are either not sufficiently long to also hold the strengthening arc structure, or the studs need replacement for some reason. All three options are within the scope of the present invention.

In an embodiment of the invention, at least part of said plurality of second fastening means are identical to said plurality of first fastening means. With the introduction of the strengthening arc structure, a longer bolt/stud may be needed. In a preferred solution, however, studs already mounted on the wind turbine, are of a length to accommodate that the nuts are re-mounted and tightened further away from the blade along the same stud.

In an embodiment of the invention, said step of removing a plurality of first fastening means involves removing at least 10%, such as at least 25%, of the first fastening means used for mounting said blade to said outer bearing ring. In an embodiment of the invention, it involves removing at most 60%, such as at most 45%, of the first fastening means used for mounting said blade to said outer bearing ring. The percentage of first fastening means removed here is correlated to how large a strengthening arc structure may be mounted and spanning along the circumference of the outer bearing ring. It has been seen that there is an optimum benefit with a span between 25 and 45% as, somewhat opposite to expected, the load distribution in the bearing is improved when keeping the arc size less than 60%; even more when less than 45%.

In an embodiment of the invention, said rotor is stopped in a position where said blade is in 12 o'clock or 6 o'clock position. Preferred is to stop the rotor such that the blade is in 6 o'clock position; hereby the working area is substantially a horizontal plane and handling of fastening means and arc are made easier.

Further, the invention relates to a wind turbine comprising a rotor, a nacelle, and a tower; said rotor comprising a hub and at least one pitch controlled wind turbine blade, said blade comprising a pitch bearing including an inner and an outer bearing ring, and pitch controlling means for pitching said blade by means of said bearing. Said inner bearing ring is mounted on said hub and said blade is mounted on and abuts said outer bearing ring, and a strengthening arc structure is mounted on said outer bearing ring, opposite the blade.

In an embodiment of the invention, said bearing comprise at least two rows of rolling elements. It should be emphasised that the term "rolling elements" is to be understood as any form of rolling parts of a bearing such as balls, rollers or other.

In an embodiment of the invention, said rolling elements are balls. The most benefit of the present invention has been seen in wind turbine bearings with two row ball bearings.

In an embodiment of the invention, said strengthening arc structure spans at least 10%, such as at least 25%, of the circumference of the outer bearing ring. In an embodiment, said strengthening arc structure could span at least 5% of the circumference of the outer bearing ring.

In an embodiment of the invention, said strengthening arc structure spans at most 60%, such as at most 45%, of the circumference of the outer bearing ring.

In an embodiment of the invention, said outer bearing ring has no strengthening arc structure on at least 25%, such as at least 40% or at least 55%, of the circumference of the outer bearing ring.

In an embodiment of the invention, said strengthening arc structure is a single element which spans between 30% and 45%, of the circumference of the outer bearing ring.

In an embodiment of the invention, a plurality of second fastening means is used for connecting said blade to said strengthening arc structure via through-going holes in said outer bearing ring. It is advantageous that the outer or both bearing rings comprise through-going holes in that it enables a simple way of attaching the bearing. The second fastening means are typically bolts or studs with nuts.

In an embodiment of the invention, said strengthening arc structure has a radial width substantially aligned with the radial width of said outer bearing ring. For some turbines, the outer bearing ring is simultaneously equipped with gears to be used for electric pitch motors.

In such case, the position of these pitch motors may make it advantageous to substantially align the radial width with the outer bearing ring. In other embodiments, the maximum width of the strengthening arc structure is between 50% and 400%, such as between 80% and 200%, of the radial width of said outer bearing ring. The width may be decided based on the specific turbine in use.

In an embodiment of the invention, said strengthening arc structure has an axial thickness of less than 100%, such as less than 75% or less than 50%, of the radial width of said outer bearing ring.

Further, the present invention relates to a wind turbine comprising a rotor, a nacelle, and a tower, wherein a method of prolonging pitch bearing lifetime has been performed.

BRIEF DESCRIPTION OF THE DRAWINGS

The invention will now be described in the following with reference to the figures in which.

DETAILED DESCRIPTION OF THE DRAWINGS

Figure 1:
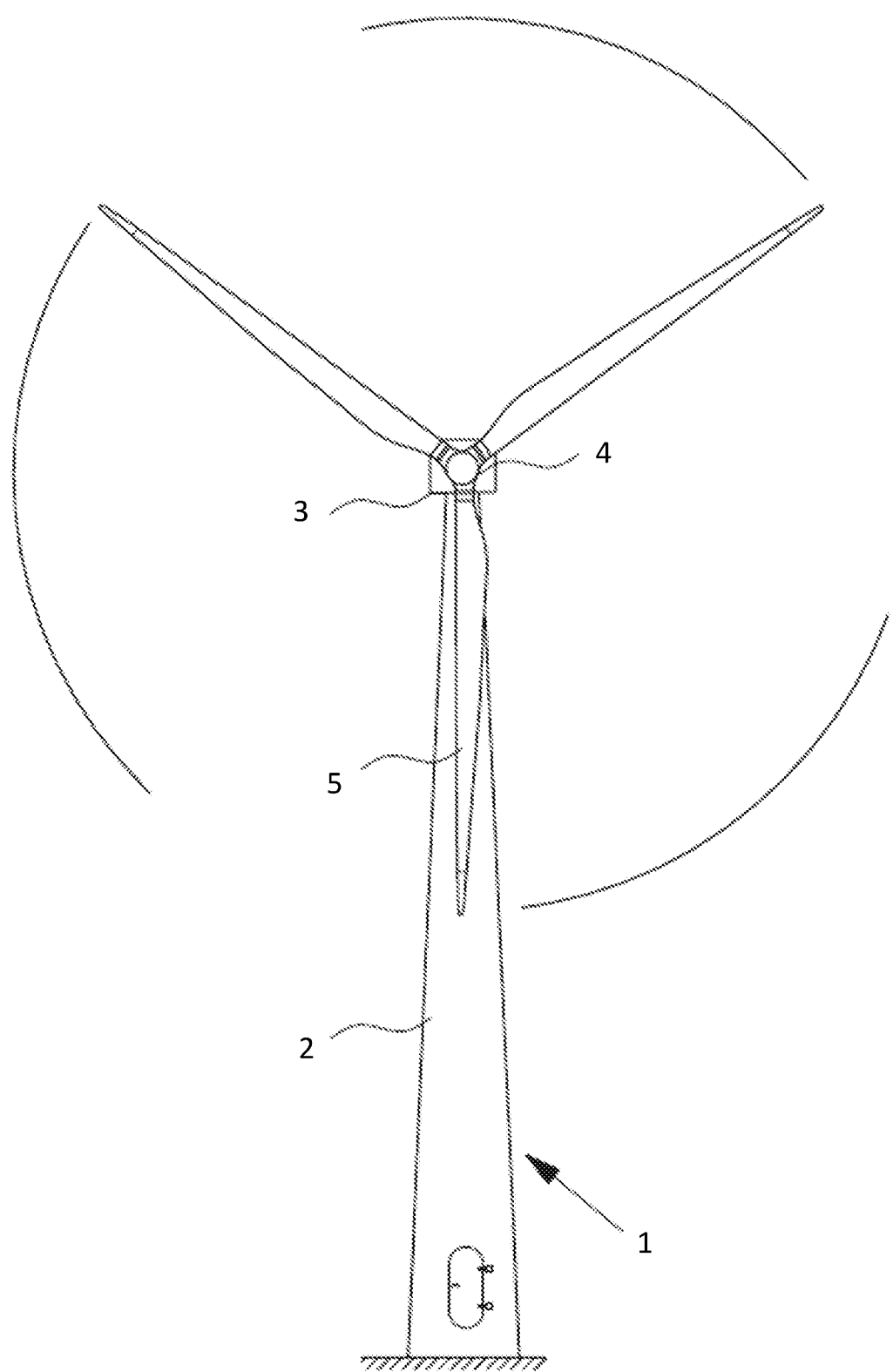
FIG. 1 illustrates a wind turbine as seen from the front.

FIG. 1 illustrates a wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front. The wind turbine 1 shown here is an onshore turbine, but the invention applies equally well to an offshore turbine.

Figure 2:
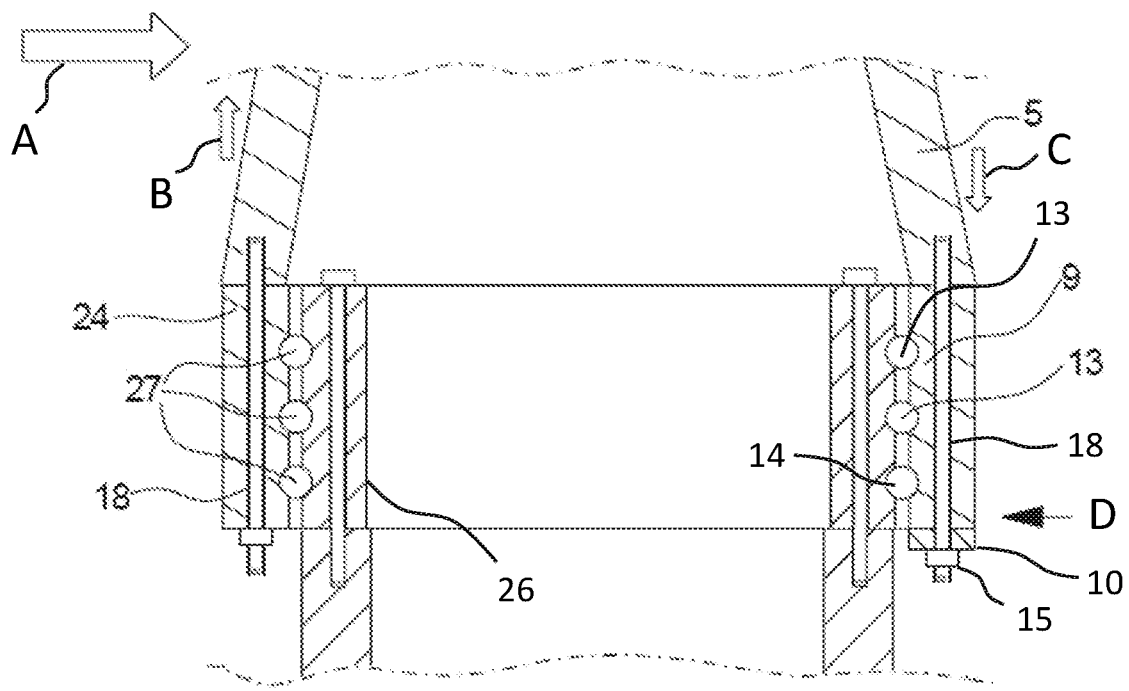
FIG. 2 illustrates a cross section of a wind turbine blade connected to a hub through a pitch bearing comprising a strengthening arc structure.

FIG. 2 illustrates a cross section of a wind turbine blade 5 connected to a hub 7 via a pitch bearing 9, the blade 5 is attached to the outer bearing ring 24 and the hub 7 is attached to the inner bearing ring 26. In this embodiment the pitch bearing 9 is a triple row 27 ball bearing, but it could also be a double or four row ball bearing, a roller bearing or even a combination of balls/rollers.

The pitch bearing has to transfer forces mainly from three different sources. The blade 5 (and the bearings 9 themselves) is under constant influence of the force of gravitation. The direction of the gravitational force varies depending on the position of the blades 5, inducing different loads on the pitch bearings 9. When the blade is in motion the bearing 9 is also under influence of a centrifugal force, which mainly produces an axial pull in the bearing 9. Finally, the bearings 9 are under influence of the wind load on the blades 5. This force is by far the greatest load on the bearings 9 and it produces a massive moment, which the bearings 9 have to withstand.

Since the pitch mechanism on traditional pitch wind turbine 1 usually can pitch the blade 5 through a substantial angle e.g. a little over 90°, the load on the pitch bearings 9 varies under normal operation. The wind load A on the blade 5 will make the blade 5 exhibit an outwards pulling force B in the part of the outer bearing ring 24 of the bearing 9 facing the wind load A (leading edge) and exhibit an inwards pushing force C on the part of the outer bearing ring 24 facing away from the wind load A (trailing edge). When the part of the outer bearing ring 24 facing away from the wind load A has to cope with the combined forces from wind load A and pushing force C, the result is that the rows of balls 13 on this part are not uniformly loaded. Instead the larger part of the load from the outer bearing ring 24 towards the balls will be on the innermost row of balls 14.

Experience has shown that over time this increased load on a minor part D of the outer bearing ring 24 towards a single row of balls 14 may cause for region D of the outer bearing ring 24 to have a tendency to crack. If not discovered in due time and allowed to spread out through the outer bearing ring, then ultimately there is a risk for the bearing to collapse and the blade falling off the wind turbine. This risk of cracking could be reduced by making the bearing rings thicker and therefore more rigid, but this would increase the cost and the weight of the bearing significantly. Furthermore, for wind turbines with some years of production history already, it is not straight-forward to simply replace the bearing, when it is realized that similar wind turbines start to fail, as such step would require a costly combination of a new bearing and an external crane to remove the blade during the process.

Therefore, the present invention provides an improved solution, as shown in FIG. 2. FIG. 2 illustrates the inventive concept that the free end (opposite the blade) of the outer bearing ring 24 is provided with a strengthening arc structure 10. The strengthening arc structure 10 is fixed to the outer bearing ring 24 and thereby provides the outer bearing ring 24 with additional strength and rigidity where it is needed.

Figure 3:
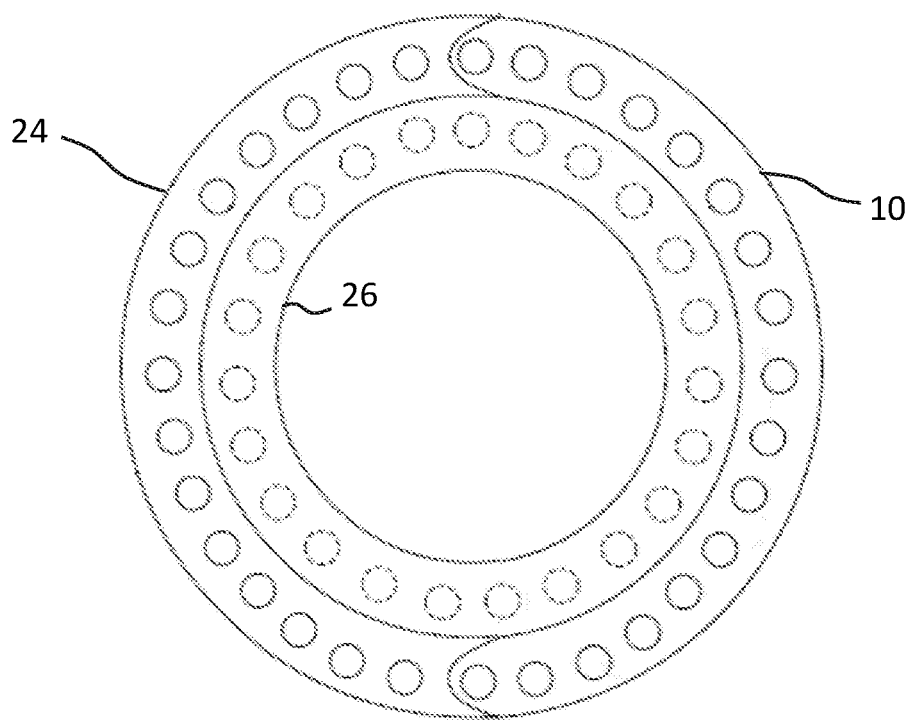
FIG. 3 illustrates the same embodiment of a pitch bearing as illustrated in FIG. 2 as seen from below.

FIG. 3 illustrates the same embodiment of a pitch bearing as illustrated in FIG. 2 as seen from below (no bolts/studs/nut shown, only the through-going holes). In this embodiment of the invention the strengthening arc structure 10 is shaped as an annular semicircular ring. In this embodiment of the invention the strengthening arc structure 10 covers approximately 180° of the outer bearing ring 24 but in other embodiments the strengthening arc structure 10 could cover a bit more or preferably less of the outer bearing ring 24. It is noted that shown here the radial width of the strengthening arc structure is more or less aligned with the radial width of the outer bearing ring. However, in other embodiments of the invention the strengthening arc structure 10 could have a radial width varying from the radial width of the outer bearing ring.

Figure 4:
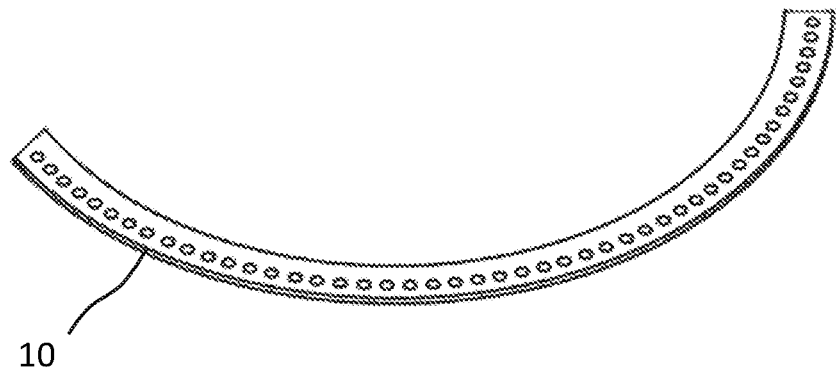
FIG. 4 illustrates a strengthening arc structure.

FIG. 4 illustrates the strengthening arc structure 10 in itself in an embodiment where it would cover approximately 120° of the outer bearing ring 24. Compared to FIG. 3, it is also clear that in this embodiment the number of bolts/studs for the strengthening arc structure 10 would be somewhat higher. Indeed, the number of holes in the strengthening arc structure 10 of FIGS. 3 and 4 are shown as examples only and this number may vary.

Figure 5:
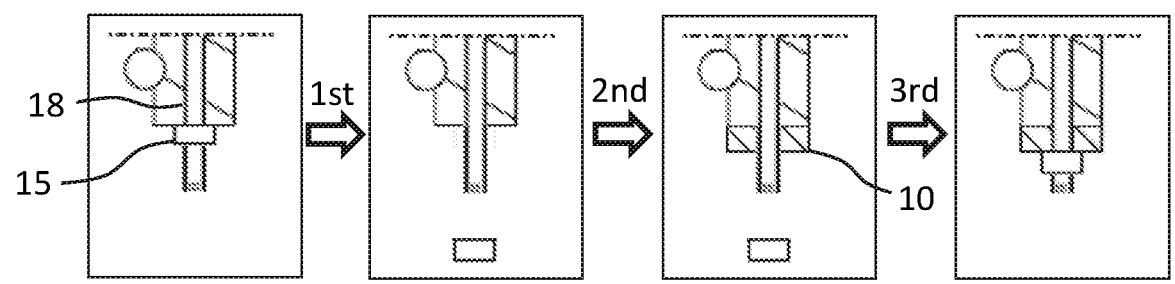
FIG. 5 illustrates method steps according to an embodiment of the invention.

FIG. 5 illustrates the primary steps in an embodiment of the inventive method, as illustrated through focus on a single nut/stud from region D from FIG. 2. In the first step, the nut 15 is removed, in the second step the strengthening arc structure 10 is positioned on the stud 18, and in the third step, the nut 15 (same or a new one) is put back onto the stud 18. These method steps would work equally well if it would be bolts being removed and put back.

The invention has been exemplified above with reference to a specific strengthening arc structure in a pitch bearing 9 for a wind turbine 1. However, it should be understood that the invention is not limited to the particular examples described above but may be designed and altered in a multitude of varieties within the scope of the invention as specified in the claims. The invention works equally well for hydraulic pitch and for electric pitch.

The invention claimed is:

1. A method of prolonging pitch bearing lifetime for a wind turbine comprising:
   a rotor,
   a nacelle, and
   a tower,
   wherein said rotor comprises a hub and at least one pitch controlled wind turbine blade, said blade comprising:
      a pitch bearing including an inner and an outer bearing ring, and
      pitch controlling means for pitching said blade by means of said bearing,
      wherein said inner bearing ring is mounted on said hub and said blade is mounted on and abuts said outer bearing ring,
   said method comprising the steps of:
      stopping said rotor from rotating;
      removing a plurality of first fastening means used for mounting said blade to said outer bearing ring;
      mounting a strengthening arc structure on said outer bearing ring opposite the blade; and
      installing a plurality of second fastening means, thereby connecting said blade and said strengthening arc structure to said outer bearing ring.

2. The method according to claim 1, wherein said plurality of first fastening means comprises bolts, nuts and/or studs.

3. The method according to claim 1, wherein at least part of said plurality of second fastening means is identical to said plurality of first fastening means.

4. The method according to claim 1, wherein said step of removing a plurality of first fastening means involves removing at least 10% of the first fastening means used for mounting said blade to said outer bearing ring.

5. The method according to claim 1, wherein said step of removing a plurality of first fastening means involves removing at most 60% of the first fastening means used for mounting said blade to said outer bearing ring.

6. The method according to claim 1, wherein said step of stopping said rotor involves stopping the rotor in a position where said blade is in 12 o'clock or 6 o'clock position.

7. A wind turbine, comprising:
   a rotor,
   a nacelle, and
   a tower,
   wherein said rotor comprises a hub and at least one pitch controlled wind turbine blade, said blade comprising:
      a pitch bearing including an inner and an outer bearing ring, and
      pitch controlling means for pitching said blade by means of said bearing,
      wherein said inner bearing ring is mounted on said hub and said blade is mounted on and abuts said outer bearing ring, and
      wherein a strengthening arc structure is mounted on said outer bearing ring opposite the blade.

8. The wind turbine according to claim 7, wherein said bearing comprises at least two rows of rolling elements.

9. The wind turbine according to claim 7, wherein said rolling elements are balls.

10. The wind turbine according to claim 7, wherein said strengthening arc structure spans at least 10% of the circumference of the outer bearing ring.

11. The wind turbine according to claim 7, wherein said strengthening arc structure spans at most 60% of the circumference of the outer bearing ring.

12. The wind turbine according to claim 7, wherein said outer bearing ring has no strengthening arc structure on at least 40% of the circumference of the outer bearing ring.

13. The wind turbine according to claim 7, wherein said strengthening arc structure is a single element which spans between 30% and 45% of the circumference of the outer bearing ring.

14. The wind turbine according to claim 7, wherein a plurality of second fastening means is used for connecting said blade to said strengthening arc structure via through-going holes in said outer bearing ring.

15. The wind turbine according to claim 7, wherein said strengthening arc structure has a radial width substantially aligned with the radial width of said outer bearing ring.

* * * * *